Figure 1:
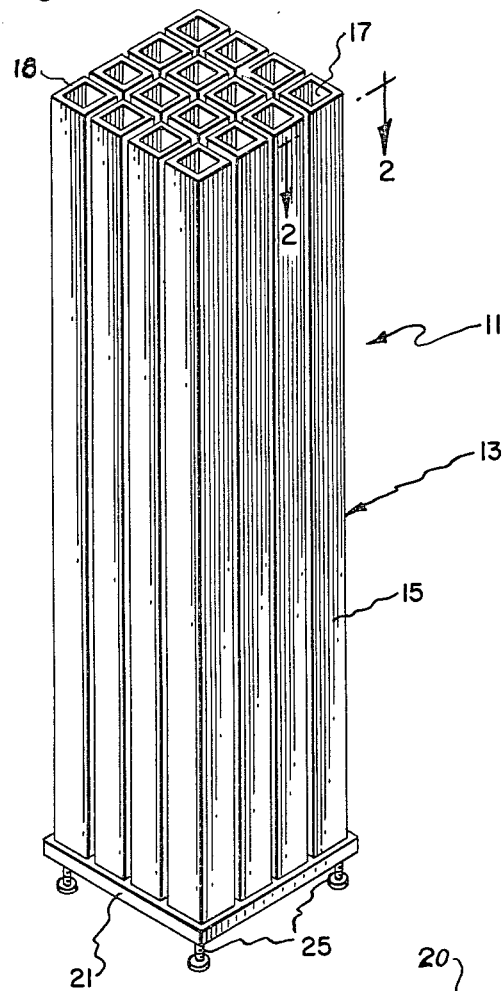
Figure 4:
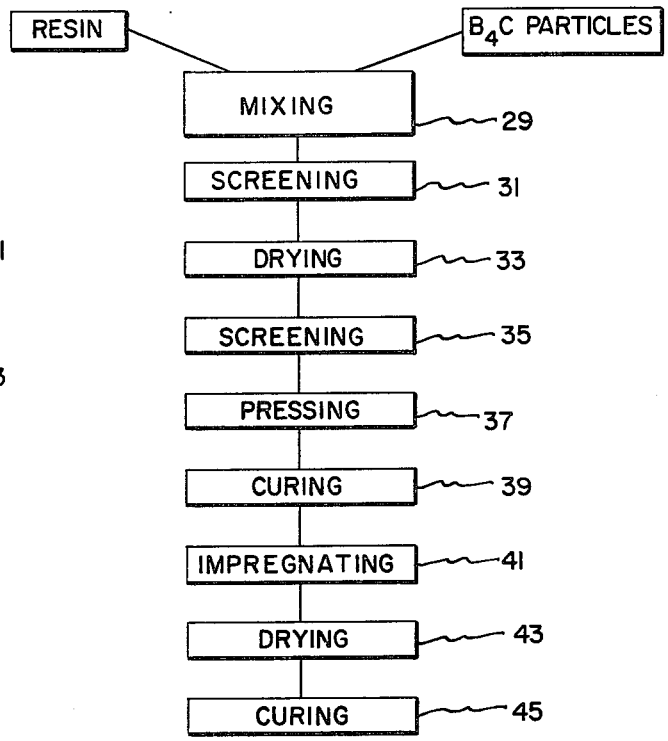
Figure 3:
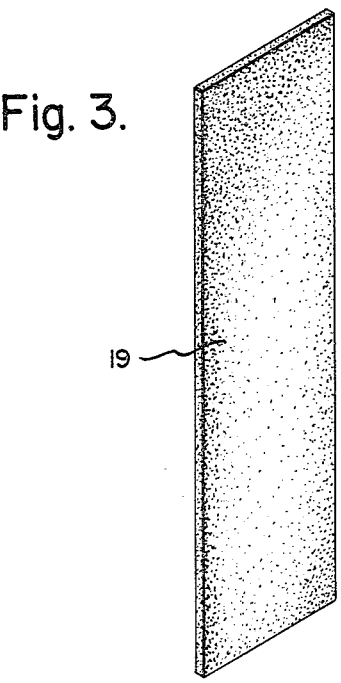
Figure 2:
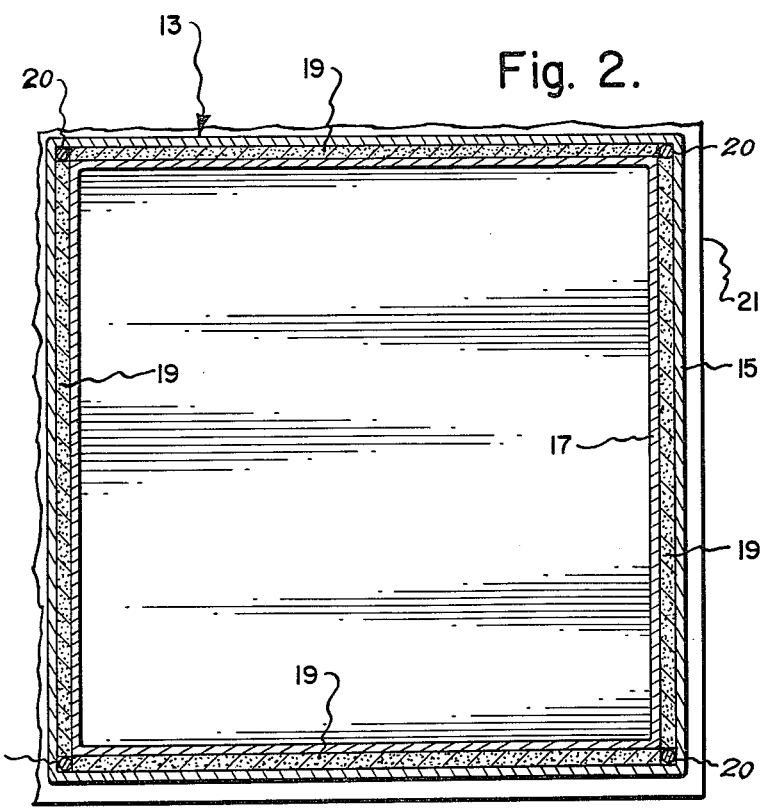

United States Patent [19]

Halasa et al.

[11] 4,225,567
[45] Sep. 30, 1980

[54] SOLUTION POLYMERIZATION OF CHLOROPHOSPHAZENE WITH SULFUR MODIFIER

[75] Inventors: Adel F. Halasa, Bath; James E. Hall, Akron, both of Ohio

[73] Assignee: The Firestone Tire & Rubber Company, Akron, Ohio

[21] Appl. No.: 739,212

[22] Filed: Nov. 5, 1976

[51] Int. Cl.² ............................................. C01B 25/10
[52] U.S. Cl. ................................................... 423/300
[58] Field of Search ......................................... 423/300

[56] References Cited

PUBLICATIONS

MacCallum et al., "The Effect of Sulfur on the Polymerization of Hexachlorocyclotriphosphazene", Polymer letters, vol. 7, 743–747, (1969).

Primary Examiner—O. R. Vertiz
Assistant Examiner—Gregory A. Heller

[57] ABSTRACT

Solution polymerization of cyclic dichlorophosphazenes represented by the general formula $(NPCl_2)_n$ in which "n" is less than 15 to essentially linear polydichlorophosphazenes in which the degree of polymerization is within the range of 20 to 50,000 is improved by the use of selected solvents and by the presence of elemental sulfur or sulfur donating compounds in the polymerization mixture.

13 Claims, No Drawings

SOLUTION POLYMERIZATION OF CHLOROPHOSPHAZENE WITH SULFUR MODIFIER

This invention relates to the solution polymerization of cyclic polychlorophosphazenes represented by the general formula $(NPCl_2)_n$ in which n is 15 or less, usually 3 or 4, to produce essentially linear polydichlorophosphazenes in which the degree of polymerization is selectively controlled within the range of 20 to 50,000.

The bulk polymerization of low molecular weight cyclic polydichlorophosphazenes is described in U.S. Pat. No. 3,370,020 issued Feb. 20, 1968 and elsewhere in the literature.

It is also known that the thermal polymerization of hexachlorocyclophosphazene and octachlorocyclophosphazene can be effected in the presence of various catalysts as reported in "Phosphorus-Nitrogen Compounds" published 1973 by Interscience Publishers, New York.

Previous attempts to polymerize cyclic dichlorophosphazenes in solution have resulted in excessive gelation and the production of unusable products.

The present invention resides in the use of aromatic hydrocarbon or cyclo-aliphatic hydrocarbon solvent, as the solvent medium in which the thermal polymerization of low molecular weight cyclic polydichlorophosphazenes is conducted.

Suitable hydrocarbon solvents include decalin, tetralin, napthalene, cyclohexane, toluene, dimethylbenzene, dihydroanthracene, tetramethylbenzene, cumene, cymen, mono-, di-, tri-, tetra-substituted aromatic compounds where the substituents are straight chain or branched chain hydrocarbons with up to 10 carbon atoms.

Other solvents which have been used are liquids having a dielectric constant of at least two, and which are solvents for both the cyclic dichlorophosphazene starting materials and for the sulfur, sulfur compounds or sulfur-donating compounds present as catalysts.

Further solvents which have been found suitable for such polymerizations include aromatic compounds carrying polar groups such as methoxy, N,N-disubstituted amino, halogens particularly mono-, di-, tri- or tetra-halogen substituents on the aromatic nucleus, and mixtures of said solvents or other hydrocarbon solvents of a similar nature.

Still other solvents which have been used include aromatic compounds including those which are monocyclic or polycyclic and which are either unsubstituted or substituted, especially with polar substituents such as halogen, N,N'-dialkylamino, alkoxy, and other polar groups. Aromatic solvents with up to four polar substituents on the aromatic ring have been employed. These polar substituents can be on the ring or on a side chain. For example, the aromatic ring can have either electron withdrawing groups or electron supplying groups. Examples of such solvents are 2-chloro toluene; 2,3-dichlorotoluene; 2,3-dichloroethylbenzene; and 2,3,4-trichloroethylbenzene.

The invention also comprises the use of small but significant amounts of elemental sulfur or sulfur compounds or sulfur donating compounds such as tri- or tetra-sulfides of organic compounds or tri- or tetra-sulfides or inorganic compounds in inorganic sulfides and organic sulfides. Sulfur donor compounds which are suitable are compounds which release sulfur at the temperatures at which the solution polymerization is conducted. Such compounds are commonly used in the vulcanization of rubbers include tetramethylthiuram tetrasulfides, and other tetraalkyl thiuram tetrasulfides; the reaction products of alkylene chlorides and sodium polysulfides, amine disulfides such as 4,4'-dithio dimorpholine and other compounds which release sulfur when heated to about 200° C.

It has been found that instead of controlling the temperature and other reaction conditions in order to obtain polymer of a desired molecular weight, it is now possible to obtain products with a desired molecular weight by choice of a suitable solvent as the reaction medium.

It has been further found that the presence of a small amount of sulfur either as elemental sulfur or as a sulfur compound in the solution in the polymerization mixtures appears to overcome a tendency of the solvents to react with cyclochlorophosphazenes at high temperatures forming an intractable gel.

It has also been found that the choice of solvent or mixture of solvents significantly affects the molecular weight of the resulting polymer and that as a consequence polymer of a desired molecular weight is produced by selecting an appropriate solvent and suitable reaction conditions.

A principal object of the present invention is to provide a new and improved process for the solution polymerization of cyclic dichlorophosphazenes which yields essentially linear polydichlorophosphazene polymers.

A further object of the invention is to provide a solution polymerization process which can be conducted at atmospheric pressure and at comparatively moderate temperatures and under a relatively inert and easily controlled atmosphere.

A further object of the invention is to polymerize cyclic dichlorophosphazene oligomers to produce linear polydichlorophosphazene polymers exhibiting a unique, very narrow range of molecular weights, heretofore unobtainable in previously practiced bulk polymerizations.

These and other objects are achieved by polymerizing solutions comprising cyclic dichlorophosphazene oligomers dissolved in between about 10% and up to 80% by weight of selected solvent and from about 1 to up to 20 millimoles of elemental sulfur or sulfur donating compound per mol of cyclic dichlorophosphazene oligomer, the polymerization being conducted at temperatures between about 140° C. and 225° C. in reactors which may be either glass lined stainless steel vessels or unlined stainless steel vessels, or glass vessels.

Briefly the present invention includes polymerization of cyclic dichlorophosphazenes in aromatic or cycloaliphatic hydrocarbon solvents by proceeding as follows.

All of the constituents, i.e. solvent, cyclic dichlorophosphazene oligomers and sulfur or sulfur donating compounds were charged into the reaction vessel. The sulfur was added as a solution in the hydrocarbon solvent, for ease in handling.

For solvents with boiling points below 150° C. pressurized systems were utilized with pressure from 0–1000 psig and a preferred range of 0–200 psig.

For solvents with boiling points between 150° C. and 250° C. reactions were carried out at atmospheric pressure. Dry Argon gas was passed over the reaction mixture. Care was taken at all points to prevent oxygen or moisture from being introduced into reaction mixture.

Apparatus was preheated in 140° C. oven for 24 hours before use.

Stirring was by means of magnetic bars. Polymerizations were conducted for from 40–300 hours preferably at 200°–220° C. bath temperature. The polymerization reaction mixture was usually solid at completion of reaction. Unreacted cyclics and hydrocarbon solvent were stripped by repeated washing with dry hexane in inert, dry atmosphere. Recovered polymer was dissolved in benzene yielding a mostly soluble polymer, exhibiting dilute solution viscosities between from about 0.09 to 1.2 (DSV is equivalent to inherent viscosity stated in decaliters/gram).

Volatile material swept from the reaction mixture included $H_2S$ and HCl.

The same polymerization reaction carried out under the same reaction conditions to conversions of 60% or more except that it was conducted in the absence of sulfur or sulfur donating compounds produced products which were usually gelled and insoluble in benzene. The exact nature of the effect of the sulfur on the polymerization is not fully understood.

The invention will be further described in the following examples given by way of illustration and not intended to limit the invention. The data in Table I was obtained by proceeding as follows:

EXAMPLE 1

The indicated number millimoles of elemental sulfur dissolved in tetralin or other solvent was added to a solution of cyclic dichlorophosphazene trimer in the indicated solvent, in a glass or stainless steel reaction vessel. An Argon flow of 1 to 2 ml/minute was maintained across the surface of the solution. Temperature was maintained for the indicated times and yields of 25–60% conversion to polymer were obtained.

It can be seen from Table I that the phosphonitrile trimer can be polymerized using decalin as the solvent producing high molecular weight polymers, while various solvents such as tetralin, naphthalene, decalin/tetralin mixture, prehnitene produced polymers of somewhat different molecular weights.

EXAMPLE 2

For solvents with boiling points below 190° C., such as toluene it was necessary to use a pressurized system. An Argon blanket was maintained over the polymerization solution at 10–200 psig. Every 2–6 hours the system was flushed by lowering the pressure and repressuring with fresh Argon. Other conditions were as indicated in Table II.

TABLE II

| Solvent | % $(NPCl_2)_n$ in Solvent | Millimoles of Sulfur per mol $(NPCl_2)_3$ | Temp. °C. | Time Hrs. | % Conversion |
|---|---|---|---|---|---|
| Toluene | 49 | 2.5 | 205 | 93 | 76 |
| Toluene | 60 | 3 | 205 | 46 | 33 |

EXAMPLE 3

Example 1 was repeated employing the solvents shown in Table III, resulting in 90–96% conversion of phosphonitrilic chloride oligomers to high molecular weight polymer. The resulting product after recovery was derivatized as described in U.S. Pat. No. 3,970,533 issued July 20, 1976 using $C_2$ and $C_5$ fluorinated alcohols and with o-allyl phenol for curative sites. Table III gives the final derivatized phosphonitrilic chloride polymer with trifluoro ethanol and octafluoropentanol with complete molecular weight determinations. The phosphonitrilic chloride polymer obtained from the examples discussed in Table I can be derivatized to useful fluoroalkoxide elastomers, in the same manner.

TABLE I

| Solvent | % $(NPCl_2)_n$ in Solvent | Millimoles of Sulfur per $(NPCl_2)$ | Temp. °C. | Time Hrs. | % Conversion | DSV/Gel | Solvent Ratio |
|---|---|---|---|---|---|---|---|
| Decalin* | 52 | 6 | 200 | 70 | 45 | .99/0 | |
| Decalin* | 26 | 10 | 205 | 68 | 49 | .79/0 | |
| Decalin | 25 | 5 | 210 | 70 | 50 | — | |
| Decalin | 50 | 5 | 210 | 42 | 40 | — | |
| Decalin* | 75 | 5 | 210 | 42 | 56 | .76/1.3 | |
| Decalin | 34 | 7 | 210 | 96 | 26 | — | |
| Decalin* | 50 | 4 | 210 | 93 | 18 | 1.46/1.1 | |
| Decalin | 49 | 2 | 190 | 45 | .25 | — | |
| Tetralin | 49 | 0 | 210 | 70 | 9 | .28/.5 | |
| Tetralin | 50 | 0 | 210 | 70 | 19 | .31/0 | |
| Tetralin | 50 | 0 | 210 | 70 | 15 | .25/1.4 | |
| Tetralin | 50 | 5 | 205 | 70 | 94 | .25/0 | |
| Tetralin | 53 | 6 | 200 | 70 | 45 | .31/0 | |
| Tetralin | 67 | 4 | 215 | 101 | 64 | .21/0 | |
| Tetralin | 68 | 2 | 210 | 48 | 30 | .17/0 | |
| Tetralin | 67 | 2 | 215 | 375 | 95 | .23/0 | |
| Naphthalene | 60 | 1 | 200 | 62 | — | .16/0 | |
| Naphthalene | 55 | 2 | 205 | 73 | 34 | — | |
| Decalin/Tetralin | 60 | 3 | 205 | 148 | 60 | 1.00/0 | 1:1 |
| Decalin/Tetralin | 50 | 4 | 205 | 160 | 49 | .66/0 | 7:3 |
| Decalin/Tetralin | 50 | 3 | 200 | 70 | 25 | 1.22/0 | 4:1 |
| Decalin/Tetralin | 50 | 3 | 220 | 71 | 52 | .24/0 | 4:1 |
| Decalin/Tetralin | 50 | 3 | 220 | 70 | 36 | .26/0 | 9:1 |
| Decalin/Tetralin | 50 | 3 | 220 | 70 | 52 | .18/0 | 4:1 |
| Decalin/Tetralin | 50 | 3 | 220 | 70 | 43 | .21/0 | 4:1 |
| Decalin/Tetralin | 50 | 3 | 220 | 70 | 34 | .20/0 | 4:1 |
| Decalin/Tetralin | 50 | 3 | 200 | 140 | 27 | .22/0 | 4:1 |
| Prehnitene | 50 | 3 | 205 | 162 | 84 | .42/0 | |
| Prehnitene | 52 | 3 | 200 | 112 | 50 | .58/0 | |

*1% ethanol added to benzene solutions to breakup slightly gelled polymers for DSV.

TABLE III

Polymerization of PNCl$_2$)$_3$ in Three Solvents and Derivatization to C$_2$F,C$_5$F,OAP Polyphosphazenes

| Solvent | Monomer Concentration | Conversion to Polymer | DSV | Derivatized Polymer | | |
|---|---|---|---|---|---|---|
| | | | | DSV | Mn × 10$^{-3}$ | Mw/Mn |
| Tetralin | 67% | 95% | 0.23 | 0.33 | 189.5 | 2.92 |
| 1,2,3,4 Tetramethylbenzene | 46% | 96% — | 0.66 | | 295.2 | 2.99 |
| 2,4-Dichlorotoluene | 12.5% | 90% | 0.58 | 0.47 | 364.3 | 2.80 |

We claim:

1. In a process for producing substantially linear polydichlorophosphazenes in which the degree of polymerization is between about 20 and 50,000, from cyclic oligomers represented by the general formula (NPCl$_2$)$_n$ in which n is an integer from 3 to about 15, the improvement which comprises conducting the polymerization of said cyclic oligomers in solution in a solvent for said oligomers, for up to about 300 hours and at a temperature between 140° and 225° C., in the presence of an amount of sulfur or sulfur-containing compound, effective to prevent the formation of appreciable amount of gel, said solvent being a liquid having a dielectric constant of at least two, and being a solvent for said sulfur or sulfur-containing compound, and being a solvent for said dichlorophosphazenes, and recovering the resulting polydichlorophosphazene produced by said process.

2. The process of claim 1 in which the sulfur material is elemental sulfur.

3. The process of claim 1 in which the solvent is an aromatic hydrocarbon.

4. The process of claim 3 in which the solvent is selected from the group consisting of decalin, tetralin, naphthalene, cumene or cymene.

5. The process of claim 3 in which the solvent is a substituted aromatic hydrocarbon.

6. The process of claim 5 in which the substituents are polar groups.

7. The process of claim 5 in which the substituents are halogens.

8. The process of claim 1 in which the sulfur compound is an organic or inorganic tri- or tetra-sulfide.

9. the process of claim 1 in which the solvent has a boiling point below 150° C. and the polymerization is carried out under a superatmospheric pressure up to 1000 psig.

10. The process of claim 1 in which the solvent initially present comprises 20 to 80% of the mixture being polymerized.

11. The process of claim 1 in which the amount of sulfur or sulfur compound is from 1 to about 20 millimoles per mol of cyclic dichlorophosphazene oligomer.

12. The process of claim 1 in which polymerization is at a temperature between 200° C. and 220° C.

13. The process of claim 1 in which polymerization is at atmospheric pressure.

* * * * *

UNITED STATES PATENT AND TRADEMARK OFFICE
CERTIFICATE OF CORRECTION

PATENT NO. : 4,225,567

DATED : September 30, 1980

INVENTOR(S) : Adel F. Halasa and James E. Hall

It is certified that error appears in the above-identified patent and that said Letters Patent are hereby corrected as shown below:

Column 5, Table III, in the heading

"$PNCl_2$)" should read -- ($PNCl_2$) --

Column 5, Table III under the heading "Conversion to Polymer" delete the "dash (-)" after -- 96% --

Column 5, Table III, the last four (4) columns should read as follows:

| | Derivatized Polymer | | |
|---|---|---|---|
| DSV | DSV | $Mn \times 10^{-3}$ | Mw/Mn |
| 0.23 | 0.33 | 189.5 | 2.92 |
| -    | 0.66 | 295.2 | 2.99 |
| 0.58 | 0.47 | 364.3 | 2.80 |

UNITED STATES PATENT AND TRADEMARK OFFICE
CERTIFICATE OF CORRECTION

PATENT NO. : 4,225,567

DATED : September 30, 1980

INVENTOR(S) : Adel F. Halasa and James E. Hall

It is certified that error appears in the above-identified patent and that said Letters Patent are hereby corrected as shown below:

Column 5, Claim 1, lines 26 and 27

Delete "an amount"

Column 5, Claim 1, line 26 after the word "of" insert the phrase -- from 1 to about 20 millimoles --

Column 5, Claim 1, line 27 after the word "compound" insert the phrase

-- per mol of cyclic dichlorophosphazene oligomer, said amount of sulfur or sulfur-containing compound, being"

Column 6, delete Claim 11

Signed and Sealed this

Twenty-fourth Day of March 1981

[SEAL]

Attest:

RENE D. TEGTMEYER

Attesting Officer     Acting Commissioner of Patents and Trademarks